United States Patent
Asplund et al.

[19]

[11] Patent Number: 6,144,567
[45] Date of Patent: Nov. 7, 2000

[54] PLANT FOR TRANSMITTING ELECTRIC POWER, INCLUDING VSC-CONVERTER AND DC/DC-CONVERTER

[75] Inventors: Gunnar Asplund; Kjell Eriksson, both of Ludvika, Sweden

[73] Assignee: Asea Brown Boveri AB, Vasteras, Sweden

[21] Appl. No.: 09/381,355

[22] PCT Filed: Mar. 20, 1998

[86] PCT No.: PCT/SE98/00502

§ 371 Date: Sep. 20, 1999

§ 102(e) Date: Sep. 20, 1999

[87] PCT Pub. No.: WO98/43336

PCT Pub. Date: Oct. 1, 1998

[30] Foreign Application Priority Data

Mar. 24, 1997 [SE] Sweden .................................. 9701060
Sep. 16, 1997 [SE] Sweden .................................. 9703329

[51] Int. Cl.[7] .................................. H02M 5/47; H02J 3/00
[52] U.S. Cl. .................................. 363/37; 363/34
[58] Field of Search .................................. 363/34, 35, 36, 363/37, 97, 98, 131, 132

[56] References Cited

U.S. PATENT DOCUMENTS 3,968,419  7/1976  Ekstrom .
4,259,713  3/1981  Flisberg et al. .
4,274,043  6/1981  Heitz .
5,535,113  7/1996  Konishi .
5,561,597  10/1996  Limpaecher .
5,841,644  11/1998  Lipo et al. .
5,999,388  12/1999  Asplund .

FOREIGN PATENT DOCUMENTS

WO 9702639  1/1997  Sweden .
504 522     2/1997  Sweden .

*Primary Examiner*—Matthew Nguyen
*Attorney, Agent, or Firm*—Pollock, Vande Sande & Amernick, R.L.L.P.

[57] ABSTRACT

A plant for transmitting electric power comprises at least one VSC-converter (1). It comprises also at least one DC/DC-converter (33, 34) having two current valves connected in series and an inductance connected to a midpoint therebetween. The DC/DC-converter is through said inductance connected to a first of the poles of the direct voltage side of the converter and through a first output terminal connected to one of the current valves to the second of the poles so as to obtain an unbalanced step-up-transformation of the direct voltage between the two poles while obtaining a potential having a higher value on the second output terminal (27) of the DC/DC-converter connected to the second current valve than on said first output terminal (28).

13 Claims, 2 Drawing Sheets

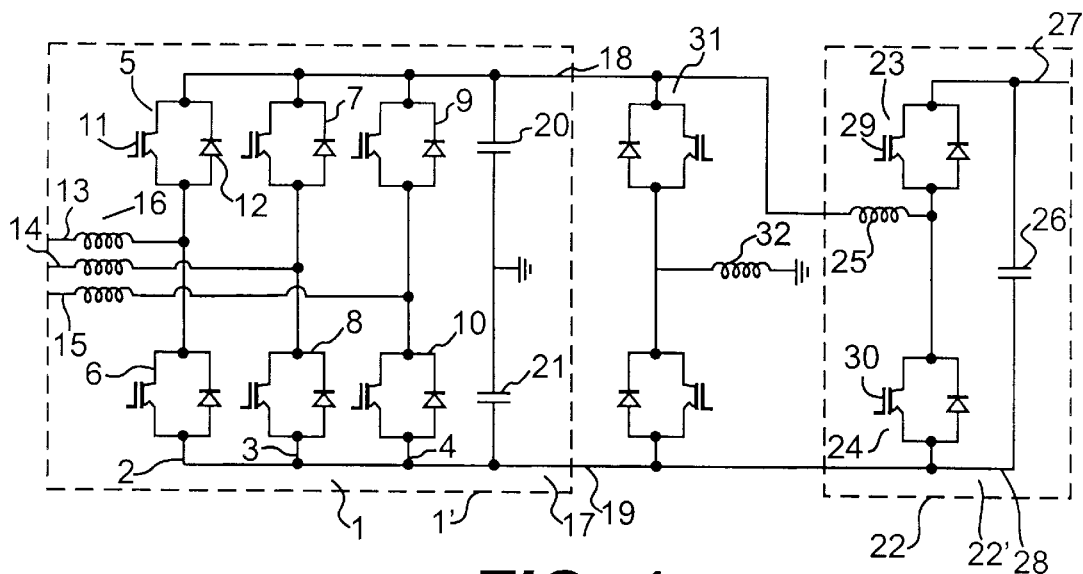
FIG. 1
FIG. 2
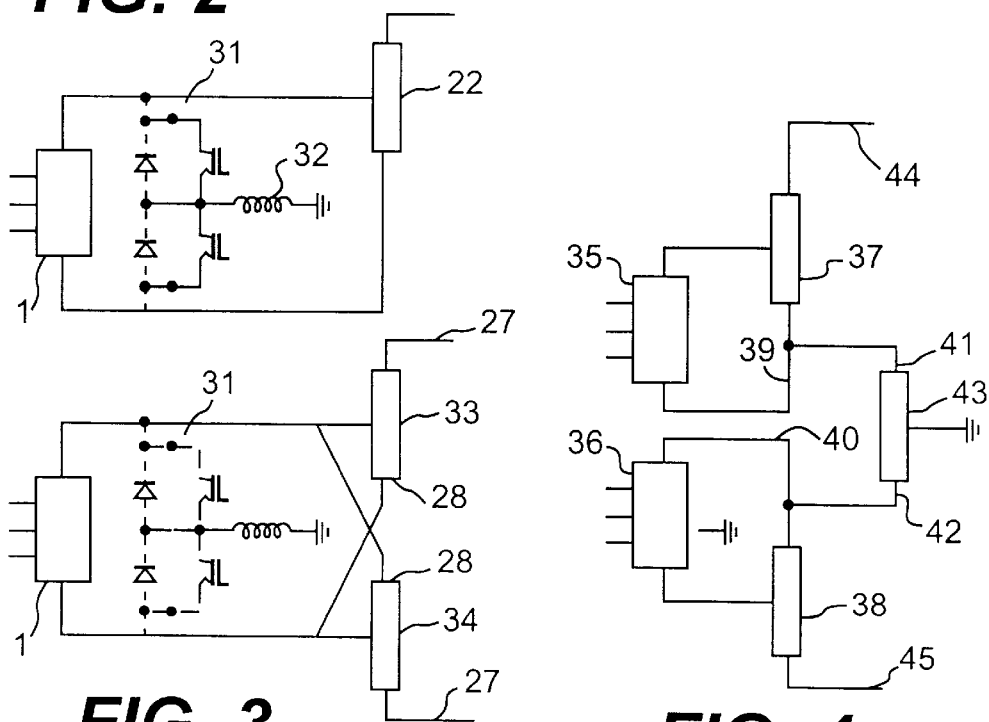
FIG. 3
FIG. 4

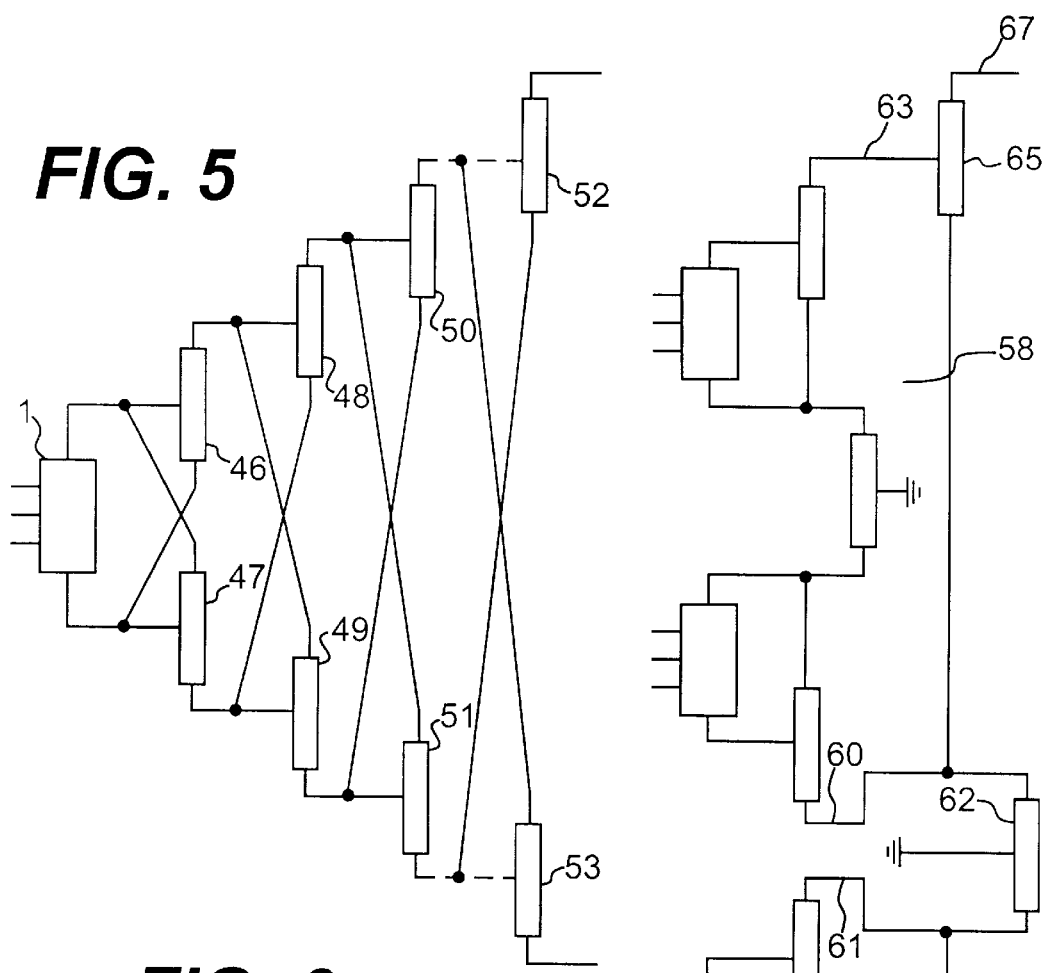
FIG. 5
FIG. 6
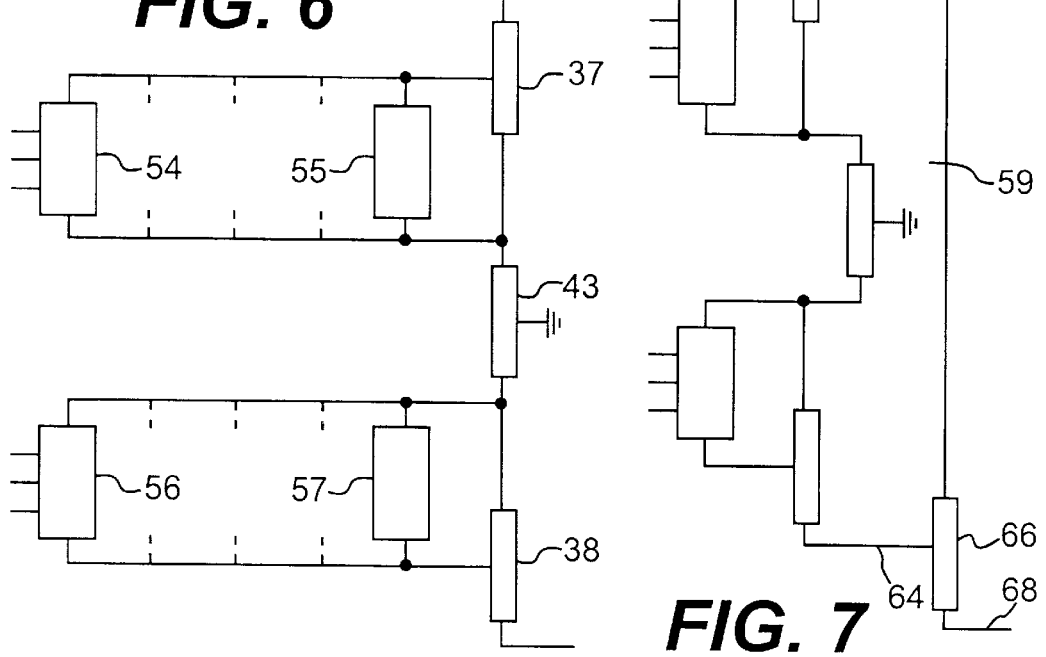
FIG. 7

PLANT FOR TRANSMITTING ELECTRIC POWER, INCLUDING VSC-CONVERTER AND DC/DC-CONVERTER

This application is a 371 of PCT/SE98/00502 filed Mar. 20, 1998.

FIELD OF THE INVENTION

The present invention relates to a plant for transmitting electric power comprising at least one VSC-converter adapted to convert direct voltage into alternating voltage and conversely and has an alternating voltage side to which at least one phase of an alternating voltage network is connected and a direct voltage side having two poles with a direct voltage thereacross.

The expression alternating voltage network is here to be given a very broad meaning comprising not only the case of a conventional alternating voltage network, but all types of electric connections on which an alternating voltage is present, such as for example output terminals of an AC-generator. With respect to the direct voltage side this may advantageously be connected to direct voltage networks for transmitting power, but it could have any other conceivable connections.

In order to illustrate but not in any way restrict the invention, the particular application of such a plant for transmitting electric power through a direct voltage network for High Voltage Direct Current (HVDC) may be mentioned. Such a plant has recently become known through the thesis "PWM and control of two and three level high power voltage source converters" by Anders Lindberg, Kungliga Tekniska Högskolan, Stockholm, 1995, in which publication a plant for transmitting electric power through a direct voltage network for High Voltage Direct Current (HVDC) is described. Before the issuance of the thesis plants for transmitting electric power through a direct voltage network for High Voltage Direct Current have been based upon the use of line-commutated CSC(Current Source Converter)-converters in stations for power transmission. By development of IGBTs (Insulated Gate Bipolar Transistor=bipolar transistor having an insulated gate) for high voltage applications and the suitability to connect them in series in valves of converters, since they may easily be turned on and off simultaneously, VSC(Voltage Source Converter)-converters for forced commutation have now instead become an alternative. This type of transmission of electric power between the direct voltage network for High Voltage Direct Current being voltage-stiff therethrough and alternating voltage networks connected thereto offers several important advantages with respect to the use of line-commutated CSCs in HVDC. For example the consumption of active and reactive power may be controlled independently of each other and there is no risk of commutation failures in the converter and thus no risk of transmission of commutation failures between different HVDC-links, which may take place in line-commutation. Furthermore, it is possible to feed a weak alternating voltage network or a network without any generation of its own (a dead alternating voltage network). Further advantages are also there.

In a plant of such design, but also in plants of the type of other designs defined in the introduction, it is desired to manage without expensive transformers and still have the possibility to obtain exactly the voltage asked for on the direct voltage side. It is then desirable to obtain this while generating as low losses as possible on achieving this voltage and at the same time to obtain as low demands as possible upon the current handling capability of the components utilized for creating the voltage from the alternating voltage delivered to the alternating voltage side.

SUMMARY OF THE INVENTION

The object of the present invention is to provide a device of the type defined in the introduction, through which the objects mentioned above are satisfied.

This is according to the invention obtained by providing the plant with at least one DC/DC-converter having two current valves connected in series and an inductance connected to a midpoint therebetween, and connecting the DC/DC-converter through the inductance to a first of the poles and through a first output terminal thereof connecting to one of the current valves to the second of the poles so as to produce an unbalanced step-up-transformation of the direct voltage between the two poles while obtaining a potential of a higher magnitude on the second output terminal of the DC/DC-converter connected to the other current valve than on the first output terminal.

A voltage adaption of the direct voltage side may take place without any expensive transformers through such an arrangement of a DC/DC-converter. This converter will then function as a so-called "step-up-converter" for raising the voltage level, while it in the corresponding way may be used for lowering the voltage level, i.e. function as a so-called "step-down-converter", when power is transferred from the direct voltage side to the alternating voltage side. Another result of this arrangement is that the total direct voltage of an output terminal (the second output terminal) of the direct voltage side is not applied to the current valves of the VSC-converter, so that these do not have to hold such a high voltage and may accordingly be made of a lower number of power semiconductor devices connected in series and additional costs may by this be saved. But through the fact that the entire voltage across the two poles of the direct voltage side of the VSC-converter, i.e. the voltage across the two current valves connected in series, are utilized for obtaining the step-up-transformation, instead of utilized a voltage between a pole and the ground therefor, a larger voltage step-up-transformation at a given ratio of the DC/DC-converter is primarily obtained. This means that a lower current handling capability is required for the components and the losses will be correspondingly lower at a given power transmittance. Thus, the demands upon current handling capability of components included in the VSC-converter may be lowered through the unbalanced step-up-transformation, but it is primarily possible to have a lower voltage of the converter at a given output voltage of the DC/DC-converter, so that a lower number of components, especially switches of turn-off type connected in series, is required in the VSC-converter for handling the voltage there.

According to a preferred embodiment of the invention the plant comprises at least two VSC-converters connected to one the DC/DC-converter each in the way mentioned, the second poles of the two VSC-converters being each connected to an output terminal of a first additional the DC/DC-converter in common thereto, the inductance of the latter converter being connected to ground for defining a zero potential level, and poles having opposite polarities than second poles of the two VSC-converters and the two DC/DC-converters first mentioned are adapted to deliver potentials having mutually opposite polarities on the second output terminals thereof.

Not only the advantages mentioned above in unbalanced transformation are obtained in this way, but it becomes also possible to connect a plurality of VSC-converters to a bipolar output in common in this way, in which the second output terminal of the respective DC/DC-converter forms one of the poles of the output, so each of the two DC/DC-converters produces a monopolar voltage of opposite signs. The first additional DC/DC-converter is required for obtaining current balance. Thus, it will be possible to operate bipolarly while utilizing the unbalanced step-up-transformation with a minimum of additional current valves (only the current valves included in the first additional DC/DC-converter). Furthermore, it will be possible to interconnect converters and by that alternating voltage networks located at completely different places in this way.

According to a second preferred embodiment of the invention, which constitutes a further development of the embodiment last mentioned, the two DC/DC-converters are adapted to deliver potentials of different signs but having the same magnitude on the second output terminals. A voltage balance between the two direct voltage poles defined by these second output terminals is thus obtained in spite of the utilization of the unbalanced step-up-transformation with the advantages associated therewith.

According to another preferred embodiment of the invention, which constitutes a further development of any of the two embodiments last mentioned, at least one of the two VSC-converters is replaced by a plurality of VSC-converters, which are connected in parallel at the direct voltage side thereof with direct voltage poles in common connected to the DC/DC-converters. Thus, this embodiment makes a connection in parallel of a larger number of VSC-converters possible should this be desired before the voltage is step-up-transformed by the DC/DC-converter, which may be advantageously made, since the voltage will be that high after the step-up-transformation carried out that the current at the second output terminals in question of the DC/DC-converter will be comparatively low also when a high power is transmitted, which in this way may be transmitted by adding the part powers from the different converters.

According to another preferred embodiment of the invention, which constitutes an advantageous further development of the embodiment first mentioned, the two converters and the first additional DC/DC-converter form a unit. The plant comprises two the units, having the second output terminal of one of the DC/DC-converters of each unit connected to a second additional DC/DC-converter at an output terminal each thereof, the inductance of the second additional DC/DC-converter is connected to ground for defining a zero potential level, the second output terminals connected to the additional second DC/DC-converter having different polarity signs, and the remaining second output terminal of the DC/DC-converter of the respective unit is connected to the inductance of a separate additional third the DC/DC-converter, the first output terminal of which is connected to the same output terminal of the additional second DC/DC-converter as the unit in question through a second output terminal is connected to so as, on the second output terminal of the respective third additional DC/DC-converter, to deliver a potential step-up-transformed further with respect to the input of this converter of an opposite sign for the respective unit. A parallel as well as a cascade connection of the DC/DC-converters is in this way obtained, so that the currents on the direct voltage side may at all the time be kept within certain limits. When the voltage is low the current is distributed among many converters and when the voltage is high the current will be low as a consequence of such a high voltage. Thus, very high direct voltages may be obtained through this embodiment with respect to direct voltages present on the direct voltage side of each single converter. The plant may be extended further according to this principle for additional step-up-transformation of the voltage.

According to another preferred embodiment of the invention the converters are arranged in connection with different generators of electric power driven by wind power, in which a converter may in this way be arranged at each generator and such generators located over a larger geographical region may be interconnected to a direct voltage network in common, preferably for transmitting the power generated through the direct voltage network to one or more stations remotely located for conversion thereof into alternating voltage to consumers of electric power.

According to another preferred embodiment of the invention the plant comprises at least two DC/DC-converters, each having a pole each of the direct voltage side of the converter connected to the inductance thereof and the opposite pole to the first output terminal thereof for delivering a potential of a higher magnitude at the second output terminals thereof than at the first output terminals thereof. A balanced high bipolar voltage may in this way be obtained through an unbalanced step-up-transformation for each pole of the converter and the need of current handling capability of the components included in the DC/DC-converters and the losses be reduced, although in such a case it may be more natural to connect the DC/DC-converters between one of the poles and the ground instead of between the two poles.

According to another preferred embodiment of the invention, which constitutes a further development of the embodiment last mentioned, the plant comprises more than two DC/DC-converters, the DC/DC-converters being connected in a cascade connection with the first output terminal of a third DC/DC-converter to the second output terminal of a first of the two DC/DC-converters and the inductance thereof to the second output terminal of the second of the two DC/DC-converters first mentioned for a continued unbalanced step-uptransformation of the direct voltage between the second output terminals. It is in this way possible to step-up-transform the voltage of the direct voltage side of the converter to very high levels so as to enable low resistive losses in power transmittance through a direct voltage network in this way through the use of comparatively few current valves with low demands upon current handling capability of the components belonging thereto.

According to another preferred embodiment of the invention a direct voltage network for High Voltage Direct Current (HVDC) is directly or indirectly connected to the direct voltage side of the VSC-converter, which constitutes a particularly advantageous application of the present invention.

BRIEF DESCRIPTION OF THE DRAWINGS

With reference to the appended drawings, below follows a description of preferred embodiments of the invention cited as examples.

In the drawings:

FIG. 1 is a very schematic diagram of a plant according to a first preferred embodiment of the invention, FIG. 2 is a diagram of the plant shown in FIG. 1 simplified with respect to FIG. 1 by summarizing symbols, FIG. 3 is a diagram corresponding to FIG. 2 of a plant according to a second preferred embodiment of the invention, FIG. 4 is a diagram corresponding to FIG. 2 of a plant according to a third preferred embodiment of the invention, FIG. 5 is a diagram corresponding to FIG. 2 of a plant according to a fourth preferred embodiment of the invention, FIG. 6 is a diagram corresponding to FIG. 2 of a plant according to a fifth preferred embodiment of the invention, and FIG. 7 is a diagram corresponding to FIG. 2 of a plant according to a sixth preferred embodiment of the invention.

DETAILED DESCRIPTION OF THE PREFERRED EMBODIMENTS

The structure of a plant for transmitting electric power according to the invention is very schematically and in simplified way illustrated in FIG. 1, in which only the components having directly something to do with the function according to the invention have been shown in the drawing for facilitating the comprehension of the invention. The plant comprises a VSC(Voltage Source Converter)-converter 1 in the form of a conventional so-called six-pulse-bridge adapted to convert direct voltage into alternating voltage and conversely. The VSC-converter comprises three so-called phase legs 2, 3, 4, each consisting of two current valves 5–10 connected in series, in which each current valve consists of at least one breaker 11 of turn-on and turn-off type, preferably in the form of an IGBT, and a rectifying diode 12 connected in anti-parallel therewith. A great number of IGBTs may be connected in series in one single valve so as to turned on and turned off simultaneously to function as one single breaker, wherethrough the voltage across the valve is distributed among the different breakers connected in series. Thus, the symbol 11 shown in FIG. 1 also comprises a series connection of such breakers. The control of the breakers is performed by pulse with modulation (PWM). One phase 13–15 of a three phase alternating voltage network is connected to the midpoints of the respective phase leg and it forms an alternating voltage side 16 of the converter. On the direct voltage side 17 of the converter two capacitors 20, 21 are connected in series between a first pole conductor 18 and a second pole conductor 19 with a grounded midpoint so as to define the direct voltage of the direct voltage side and to ensure that one of the pole conductors is on a potential $+U_d$ and the other on a potential $-U_d$. This constitutes conventional technique.

The plant comprises also a DC/DC-converter 22, which consists of two current valves 23, 24 connected in series and being of a similar type as the current valves of the six-pulse-bridge, an inductor connected to the midpoint between these current valves and a capacitor 26 connected in parallel with the current valves between the two output terminals 27, 28 of the converter. The DC/DC-converter is through the inductance 25 connected to a first of the poles 18 of the direct voltage side of the converter and through a first output terminal 28 to the second of these poles 19. This means that the voltage potential of the first output terminal 28 will be $-U_d$, while it will be $+U_d (2X-1)$ at the second output terminal 27, so that accordingly an unbalanced step-up-transformation of the direct voltage across the two poles takes place. X is then the ratio of the DC/DC-converter, and this depends upon the relationship between the conduction times of the two semiconductor devices 29, 30, which are alternatingly made conducting so as to apply different voltages across the inductance 25. If the ratio X is for example 3, the output voltage on the second output terminal 27 will then be $5U_d$. This is to be compared with the case of connecting the DC/DC-converter directly between ground and a pole, wherein at the same ratio thereof the output voltage would be $3U_d$.

This means the advantages discussed above of a lower demand upon current handling capability of the components, since it is transformed up to a higher voltage, at the same time as the losses become lower.

The plant comprises further a so-called fourth phase leg 31 with the same design as the other phase legs, but connected between the poles 18 and 19 and has the midpoint thereof connected to an inductance 32, which in its turn is connected to ground. The fourth phase leg or "balancing converter" is controlled through pulses applied on the semiconductor devices thereof with a frequency associated with the frequency by which the valves of the converter are controlled. The latter may typically be about 2 kHz. A zero potential level may be defined through this additional phase leg, which is necessary for enabling a monopolar operation obtainable through this plant, which is simplifiedly illustrated in FIG. 2. A drawback of such a monopolar operation is, however, that electrodes are required, which in the HVDC-case are buried in the ground and may cause problems. The possibility to monopolar operation of a direct voltage network is therefore primarily utilized when there is a failure on one of the cables of the two pole conductors in a network for bipolar operation. The contents of the two dashed frames 1' and 22' in FIG. 1 is in FIG. 2 summarized through the symbols 1 and 22. The corresponding symbols for VSC-converters and DC/DC-converters have been used in the other figures.

A plant according to a second preferred embodiment of the invention is illustrated in FIG. 3 and it is constructed according to the same principle as the plant according to FIG. 2, but it is modified for obtaining a bipolar voltage. The additional phase leg 31 is here illustrated by dashed lines, since it is not necessary, but when it is there it is possible to operate through half the bridge towards ground upon cable failure. Thus, this embodiment has two DC/DC-converters 33, 34, which have a pole each of the direct voltage side of the converter 1 connected to the inductance thereof and the opposite pole to the first output terminal 28 thereof, so as to deliver a potential on their second output terminals 27 having a higher value than on the first output terminals thereof, namely $+U_d (2X-1)$ and $-U_d (2X-1)$, respectively.

A plant according to a third preferred embodiment of the invention is illustrated in FIG. 4, said plant comprising two converters 35, 36 connected to a DC/DC-converter 37, 38 each in the same way as the plant in FIG. 2. The second poles 39, 40 of the two converters are connected to an output terminal 41, 42 of a first additional DC/DC-converter 43 in common thereto, the inductance of which is connected to ground for defining a zero potential level. The poles 39, 40 having opposite polarities form the second poles of the two converters. Under the condition that the two DC/DC-converters 37 and 38 have a ratio X and the potential of the respective pole of the two converters is $+U_d$ and $-U_d$, respectively, the potential of the output terminals 44, 45, which may form pole conductors of a bipolar direct voltage network, will be $+U_d (2X-1)$ and $-U_d (2X-1)$, respectively. It is then possible to place the DC/DC-converter 43 so that the two converts 35 and 36 may be separated geographically and for example be connected to the output of a generator of electric power each driven by wind power, so that a plurality of such generators may in this way be connected to one and the same direct voltage network. The DC/DC-converter 43 is used for obtaining current balance, and through the arrangement thereof, accordingly through only two additional valves, it is possible to operate bipolarly.

A plant according to a fourth preferred embodiment of the invention is shown in FIG. 5 and constitutes a further development of the embodiment illustrated in FIG. 3, and this figure illustrates how an arbitrarily high voltage may be obtained through cascade coupling of DC/DC-converters 46–53. Thus, each step of connected DC/DC-converters utilized the entire output voltage from the previous step for the voltage step-up-transformation thereof, i.e. the entire bipolar voltage is used, so that the DC/DC-conversion gets maximally efficient with respect to a current dimensioning of the converters and the DC/DC-converters and the losses are minimized. If we assume that the ratio of the converters 46, 47 in step 1 is X1, of the converters 48, 49 in step 2 X2, of the converters 50, 51 in step 3 X3 and so on, and in the nth step illustrated through the converters 52 and 53 Xn, the output voltage will after the respective step be $\pm U_d$(2X1-1), $\pm U_d$ (2X1-1) (2X2-1), $\pm U_d$ (2X1-1) (2X2-1) (2X3-1) and finally $\pm U_d$[II (2Xn-1)]. If we for example assume that n=3 and X1=X2=X3=4, the output voltage of the direct voltage side of this plant will be $\pm U_d \times 343$. This shows that this DC/DC-conversion technique may without unrealistically many steps perform impressing step-up- and step-down-transformations of the voltage, respectively.

A plant according to a fifth preferred embodiment of the invention is illustrated in FIG. 6, the plant only differing from the plant illustrated in FIG. 4 by the fact that it is a plurality of converters 54–57 that may be connected in parallel on the direct voltage side thereof with direct voltage poles in common connected to the respective DC/DC-converter 37, 38, 43. The dashed lines indicate here the possibility to connect an arbitrary number of converters in parallel in this way. In this way may for example the series of generators of electric power in the form of an alternating voltage or current of any conceivable type, such as such driven by wind power, be connected to the direct current network in common, also if these are geographically comparatively widely separated. Thanks to the high voltage obtainable on the direct voltage network the total current will nevertheless be that low that the direct voltage network may deliver the electric power generated by all these generators without too large losses.

Finally, a plant according to a sixth preferred embodiment of the invention is illustrated in FIG. 7, in which the DC/DC-converters have been connected both in parallel and according to cascades. Two units 58, 59 constructed according to the embodiment according to FIG. 4 are with the second output terminal 60, 61 of one of the DC/DC-converters of each unit connected to a second additional DC/DC-converter 62 at each output terminal thereof, in which the inductance of the DC/DC-converter 62 is connected to ground for defining a zero potential level. The units are so connected that the output terminals 60 and 61 connected to the DC/DC-converter 62 have opposite polarity signs. The remaining second output terminal 63, 64 of the DC/DC-converter of the respective unit is connected to the inductance of a separate additional third DC/DC-converter 65, 66, the first output terminal of which is connected to the same output terminal of the additional second DC/DC-converter 62 as the unit in question through one the second output terminal 60, 61 is connected to so as to on the second output terminal 67, 68 deliver a potential further step-up-transformed with respect to the input of this converter and having opposite signs for the respective unit. The voltage of the output terminals 67, 68 will then be $\pm U_d$ (2X1-1) (2X2-1), in the case that the ratio of the DC/DC-converters in the first stage is X1 and the two 65, 66 in the second stage is X2. An advantage of this way to make connections is that the direct currents are all the time kept within certain limits. When the direct voltage is low the current is distributed among many converters, so that the current handling capability of the components included therein has not to be to high, and when the voltage is high the current will be low as a consequence of the high voltage.

The invention is of course not in any way restricted to the preferred embodiments described above, but many possibilities to modifications thereof would be apparent for a man skilled in the art without departing from the basic idea of the invention as defined in the claims.

It is for example well possible to combine the plants according to the different embodiments with each other, and the number of step-up-transformation steps or the number of VSC-converters included in the plants may in principle be arbitrary.

The VSC-converter may be designed in another way than shown and for example have a NPC-bridge.

What is claimed is:

1. A plant for transmitting electric power comprising:

at least first and second VSC-converters, each adapted to convert direct voltage into alternating voltage and convert alternating voltage into direct voltage, and each having an alternating voltage side to which at least one phase of an alternating voltage network is connected and a direct voltage side having first and second poles with a direct voltage thereacross;

each of said VSC-converters being connected to first and second DC/DC-converters, respectively, each of said first and second DC/DC-converters having two current valves connected in series and an inductance connected to a midpoint therebetween;

said first DC/DC-converter being connected through said inductance to said first pole in said first VSC-converter and through a first output terminal connected to one of the current valves and to said second pole in said first VSC-converter;

said second DC/DC-converter being connected through said inductance to said first pole in said second VSC-converter and through a first output terminal connected to one of the current valves and to said second pole in said second VSC-converter;

whereby an unbalanced step-up-transformation of the direct voltage between the two poles in each of said first and second VSC-converters is produced while obtaining a potential of a higher magnitude on a second output terminal of each of said first and second DC/DC-converters, respectively, connected to the other current valve than on said first output terminal; and wherein said second poles of said first and second VSC-converters are each connected to an output terminal of a first additional said DC/DC-converter in common thereto, the inductance of said first additional DC/DC converter being connected to ground for defining a zero potential level, and wherein poles having opposite polarities form said second poles of said first and second VSC-converters and said first and second DC/DC-converters are adapted to deliver potentials having mutually opposite polarities on the second output terminals thereof.

2. A plant according to claim 1, wherein said first and second DC/DC-converters are adapted to deliver potentials of different signs but having the same magnitude on said second output terminals.

3. A plant according to claim 1, wherein at least one of said first and second VSC-converters is replaced by a plurality of VSC-converters which are connected in parallel at the direct voltage side thereof with direct voltage poles in common connected to said DC/DC-converters.

4. A plant according to claim 1, wherein said first and second VSC-converters, said first and second DC/DC-converters and the first additional DC/DC-converter form a unit, and wherein the plant comprises two said units having the second output terminal of one of the DC/DC-converters of each unit connected to a second additional DC/DC-converter each at an output terminal thereof, and wherein the inductance of the second additional DC/DC-converter is connected to ground for defining a zero potential level, the second output terminals connected to said additional second DC/DC-converter having different polarity signs, and wherein the remaining second output terminal of the DC/DC-converter of the respective unit is connected to the inductance of a separate additional third said DC/DC-converter, the first output terminal of which is connected to the same output terminal of the additional second DC/DC-converter as the unit in question through a said second output terminal is connected to so as, on said second output terminal of the respective third additional DC/DC-converter, to deliver a potential step-up-transformed further with respect to the input of this converter of an opposite sign for the respective unit.

5. A plant according to claim 1, wherein at least some of the converters are intended to be remotely arranged with respect to each other at sources for generating electric power delivered thereto through the alternating voltage network connected thereto, and wherein these VSC-converts are adapted to transfer this electric power to a direct voltage network in common arranged on the direct voltage side thereof.

6. A plant according to claim 5, wherein the converters are arranged connected to different generators of electric power driven by wind power.

7. A plant according to claim 1, comprising means for defining a zero potential level connected to at least one of the poles of the VSC-converter.

8. A plant according to claim 7, wherein said means is formed by a connection in series of two current valves each consisting of a semiconductor element of turn-off type and rectifier diode connected in anti-parallel therewith and an inductance connected to the midpoint between the two valves, the opposite end of which with respect to said midpoint being connected to ground.

9. A plant according to claim 1, wherein said first and second DC/DC-converters have each a pole of the direct voltage side of the converter connected to the inductance thereof and the opposite pole to the first output terminal thereof for delivering a potential of a higher magnitude at the second output terminals thereof than at the first output terminals.

10. A plant according to claim 9, wherein said first and second DC/DC-converters are adapted to deliver potentials of the same magnitude but with opposite signs at the second output terminals thereof.

11. A plant according to claim 9, comprising a plurality of DC/DC-converters connected in a cascade connection, with the first output terminal of a first cascaded DC/DC-converter being connected to the a second output terminal of a first of two cascaded DC/DC-converters and the inductance of said first cascaded DC/DC converter being connected to a second output terminal of the second of the two cascaded DC/DC converters for a continued unbalanced step-up-step-transformation of the direct voltage between said second output terminals.

12. A plant according to claim 1, wherein said VSC-converter is connected to an alternating voltage network having three phases and comprises therethrough a six-pulse-bridge.

13. A plant according to claim 1, wherein a direct voltage network for high voltage direct current (HVDC) is directly or indirectly connected to said direct voltage side of said first and second VSC-converters.

* * * * *